UNITED STATES PATENT OFFICE.

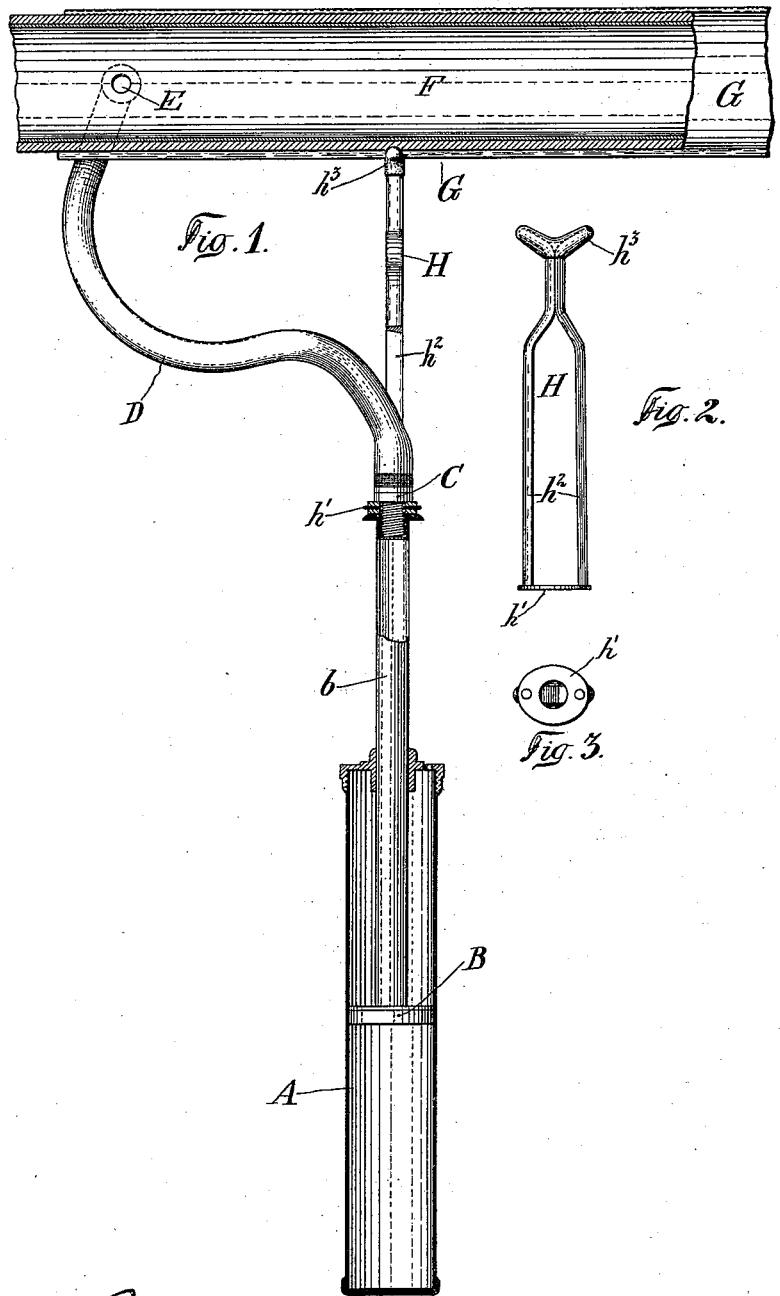

EDOUARD WICKY, OF LAUSANNE, SWITZERLAND.

AIR-PUMP FOR INFLATING PNEUMATIC CYCLE-TIRES.

SPECIFICATION forming part of Letters Patent No. 595,899, dated December 21, 1897.

Application filed February 16, 1897. Serial No. 623,620. (No model.)

*To all whom it may concern:*

Be it known that I, EDOUARD WICKY, merchant, a citizen of the Republic of Switzerland, residing in Lausanne, Switzerland, have invented certain new and useful Improvements in Air-Pumps Used for Inflating Pneumatic Tires of Cycles, of which the following is a specification.

My invention relates to air-pumps of the kind employed for inflating pneumatic tires, and especially to those air-pumps which are of comparatively small dimensions and which are operated by reciprocating the cylinder with one hand while the piston-rod or support is held in the other, the cylinder being connected by means of a suitable flexible tube with the usual air-valve of the pneumatic tire.

My invention consists of an air-pump constructed substantially as hereinafter disclosed and defined in the claims.

Referring to the drawings, Figure 1 is a longitudinal section of an air-pump provided with my improved support applied to the rim of a wheel, the pneumatic tire of which is shown partly in plan and in section. Fig. 2 is a front elevation of the support. Fig. 3 is an end view of Fig. 2.

Similar letters of reference indicate corresponding parts.

Referring to the drawings, A represents a cylinder of an air-pump, and B the piston therein. Connected with the piston B is a hollow piston-rod $b$, which extends a considerable distance beyond the end of the cylinder and serves also as a compression-tube. Into the threaded end of the hollow piston-rod $b$ is screwed the threaded end of the joining-tube C, suitable washers being provided to afford a leak-proof connection. To the outer end of the joining-tube C is attached the flexible air-tube D, which is adapted to be applied to the air-valve E of the pneumatic tire F in the usual well-known manner.

The support H is constructed, preferably, in the form illustrated in Fig. 2, and is composed of a perforated base-plate $h'$, to which are riveted two parallel arms $h^2$. These arms are forked or separated from each other at the base-plate for a suitable distance, and are then brought together and suitably secured, forming a neck portion which terminates in two diverging prongs $h^3$, which are adapted to bear against the rim of the wheel. To avoid injury to the surface of the wheel, the prongs $h^3$ may be covered with rubber, leather, or other suitable material.

The support H is placed upon the end of the hollow piston-rod $b$, and the joining-tube C is passed down through the perforation in the base $h'$ of the said support and screwed firmly to its seat. In this manner the support H is rigidly secured to the end of the hollow piston-rod $b$, so as to form practically a rigid continuation of said pistod-rod and thus provides a firm solid support for the pump while being operated. The flexible air-tube D is passed down between the arms $h^2$ of the support H and attached to the outer end of the joining-tube C.

When it is desired to inflate a pneumatic tire, the air-tube D is connected with the air-valve of the tire in the usual manner. The support H is then placed against the rim of the wheel, and the rim and prongs $h'$ grasped by one hand while the other hand grasps and reciprocates the cylinder of the pump. It will be seen that owing to the rigid connection between the piston-rod and the support H a firm steady support is afforded without the danger of the parts collapsing. Moreover, by reason of the fact that the head of the support is adapted to bear against the rim of the tire and to be held there by hand it is not necessary to bend over into an uncomfortable position while inflating the tire, as when the air-pump is provided with a support which rests upon the ground.

In using my improved device the wheel is rotated until the air-valve is at the highest point, when the pump is applied, as above described. Under these conditions it is not necessary to bend the body into an uncomfortable position, and as one hand grasps the rim of the wheel when steadying the head of the support the strength of both arms is utilized, thus rendering the labor of inflating the tire less irksome.

Having thus described my invention, I claim as new and desire to secure by Letters Patent—

1. A hand-pump for inflating pneumatic tires, consisting of a movable cylinder, a piston in said cylinder, a hollow piston-rod, a flexible tube adapted to connect the outer end of the piston-rod with the air-valve, and a forked support attached rigidly to and in line with the piston-rod at both sides of the flexible tube, said support being provided with a head adapted to be applied to the rim of the wheel, substantially as set forth.

2. A hand-pump for inflating pneumatic tubes, consisting of a movable cylinder, a piston therein, a hollow piston-rod provided with a threaded end, a joining-tube threaded in the end of the piston, a forked support rigidly secured to said piston-rod by means of said joining-tube, a flexible air-tube attached to said joining-tube and extending between the arms of the support and a pronged head on the end of said support adapted to be applied to the rim of the wheel, substantially as set forth.

In testimony whereof I have signed my name to this specification in the presence of two subscribing witnesses.

EDOUARD WICKY. [L. S.]

Witnesses:
 E. IMER-SCHNEIDER,
 TH. IMER.